United States Patent [19] [11] 3,854,098
Takahashi et al. [45] Dec. 10, 1974

[54] MULTICHANNEL DISC DEMODULATION CIRCUIT

[75] Inventors: Nobuaki Takahashi, Yamato; Masaaki Sato; Yoshiki Iwasaki, both of Yokohama; Kazunori Nisikawa, Fujisawa, all of Japan

[73] Assignee: Victor Company of Japan, Ltd., Yokohama-City, Kanagawan-ken, Japan

[22] Filed: Jan. 23, 1973

[21] Appl. No.: 326,027

[30] Foreign Application Priority Data

Jan. 24, 1972 Japan .................................. 47-9534

[52] U.S. Cl...... 329/103, 179/15 BT, 179/100.4 ST, 307/232, 328/133, 329/122, 330/30 D, 331/23

[51] Int. Cl............................ H03d 3/18, G11b 3/04

[58] Field of Search ............. 329/50, 103, 110, 122; 307/237; 179/100.4 ST, 15 BT; 328/133; 331/23; 330/30 D

[56] References Cited

UNITED STATES PATENTS

| | | | |
|---|---|---|---|
| 3,258,537 | 6/1966 | Proctor | 179/15 BT |
| 3,264,413 | 8/1966 | Merritt | 179/15 BT |
| 3,413,492 | 11/1968 | Schneider | 307/232 X |
| 3,686,471 | 8/1972 | Takahashi | 179/15 BT |

OTHER PUBLICATIONS

Hatke "Automatic Phase Lock for Stereo Multiplex Detector" RCA Technical Notes No. 575, March 1964.

*Primary Examiner*—Alfred L. Brody

[57] ABSTRACT

A demodulation system employs a phase locked loop. A multichannel disc demodulation circuit has a phase comparator of a differential amplifier type having an input circuit the input AC impedance of which is set at a relatively high value. The DC impedance of a base-bias circuit of input transistors of the phase comparator is set at a relatively low value. This demodulation circuit is capable of accomplishing demodulation without the occurrence of a phase difference when an amplitude variation occurs in the envelope of an angle-modulated wave introduced as input into the phase comparator.

12 Claims, 8 Drawing Figures

MULTICHANNEL DISC DEMODULATION CIRCUIT

BACKGROUND OF THE INVENTION

This invention relates generally to a demodulation circuit for multichannel discs, and more particularly to a circuit for demodulating, without noise, an angle-modulated signal part of the recorded signal comprising a direct-wave signal and the angle-modulated wave signal picked up from a multichannel disc on which these signals have been recorded in superimposed state.

Previously, the inventor proposed a recording and reproducing system for a four channel record disc (multichannel record disc), see U.S. patent application Ser. No. 92,803, filed on Nov. 25, 1970, and now patented under U.S. Pat. No. 3,686,471, entitled "SYSTEM FOR RECORDING AND/OR REPRODUCING FOUR CHANNEL SIGNALS ON A RECORD DISC." In the proposed recording system, sum and difference signals are formed respectively to combine four channels into two channels. More specifically, four channel signals respectively designated Ch1, Ch2, Ch3, and Ch4 are combined into sum signals (Ch1 + Ch2) and (Ch3 + Ch4) and difference signals (Ch1 − Ch2) and (Ch3 − Ch4). Thereafter, the difference signals are angle modulated, to produce angle-modulated wave difference signals F(Ch1 − Ch2) and F(Ch3 − CH4) in a band higher than the above mentioned direct-wave sum signals. These signals are mixed with the direct-wave sum signals (Ch1 + Ch2) and (Ch3 + Ch4).

The two multiplexed signals {(Ch1 + Ch2) + F(Ch1 − Ch2)} and {(Ch3 + Ch4) + F(Ch3 − Ch4)} of the direct-wave sum signals and the angle-modulated wave difference signals are recorded by cutting on the left and right walls of a groove of the 45 — 45 system on a record disc.

In the reproducing system, reproduced multiplexing signals are respectively separated into direct-wave sum signals and angle-modulated wave difference signals. The latter signals are demodulated, and the original difference signals are again obtained. The sum signal (Ch1 + Ch2), difference signal (Ch1 − Ch2), sum signal (Ch3 + Ch4), and difference signal (Ch3 − Ch4) obtained in this manner are respectively matrixed, and the original signals Ch1, Ch2, Ch3, and Ch4 of the four individual channels are again obtained. These signals are reproduced audibly from four loudspeakers disposed respectively at left front, left rear, right front, and right rear positions relative to a listener.

In some cases, an absence of a signal or an abrupt decrease in the level occurs in a signal picked up by a pick-up stylus. This occurs, for example, when a pick-up stylus rides over a particle of dust in a groove of a record disc and fails to accurately trace the walls of the groove, when a part of the groove is damaged and accordingly a part of the waveform on the groove is lacking, when the waveform on the groove is so fine or complicated that the pick-up stylus jumps over it and fails to completely trace the waveform, or when a reproduced part of the groove has been worn away due to repeated reproduction of the record disc by using a pick-up cartridge having a stylus tip which has a large equivalent mass, i.e., a large moment of inertia.

As stated above, the frequency range of the angle modulated difference signal (20 KHz to 40 KHz) in the signal recorded on the groove is higher than the range of the direct wave sum signal. Accordingly, a part of the waveform having a relatively gradual curve relates to the direct wave sum signal and a part having a relatively small and fine waveform relates to the angle modulated wave difference signal. Therefore, the absence of signal and the drop in the level in the reproduced signal in each of the above described cases occurs particularly in the angle modulated wave difference signal.

In the absence of a signal and a drop in the signal level occur as described above, the amplitude of the angle-modulated wave varies widely, and this amplitude variation gives rise to a phase variation as described hereinafter. Accordingly, in this case, the generation of abnormal noise due to this phase variation has heretofore been a problem.

SUMMARY OF THE INVENTION

Accordingly, it is a general object of the present invention to provide a novel and useful demodulation circuit for multichannel discs in which the above described problem is solved.

More specifically, an object of the invention is to provide a demodulation circuit capable of accomplishing demodulation, without generating abnormal noise. Here, an object is to demodulate an angle-modulated wave picked up from a multichannel disc even when there is an abrupt change or a sudden drop in the level of this angle-modulated wave.

Another object of the invention is to provide a system for demodulating angle-modulated wave by employing a phase-locked loop. Here, an object is to provide a demodulation circuit wherein a phase comparator in the phase-locked loop is newly organized. By the use of this demodulation circuit of the invention, even when the envelope of the input angle-modulated wave undergoes amplitude variation, this amplitude variation does not appear in phase variations.

Still another object of the invention is to provide a demodulation circuit employing a phase-locked loop having a phase comparator of an organization such that its input AC impedance is high, while the DC impedance Further objects and features of the invention will be apparent from the following detailed description with respect to specific embodiments of preferred embodiment of the invention when read in conjunction with the accompanying drawings, in which like parts are designated by like reference numerals and characters.

DETAILED DESCRIPTION

Figure 1:
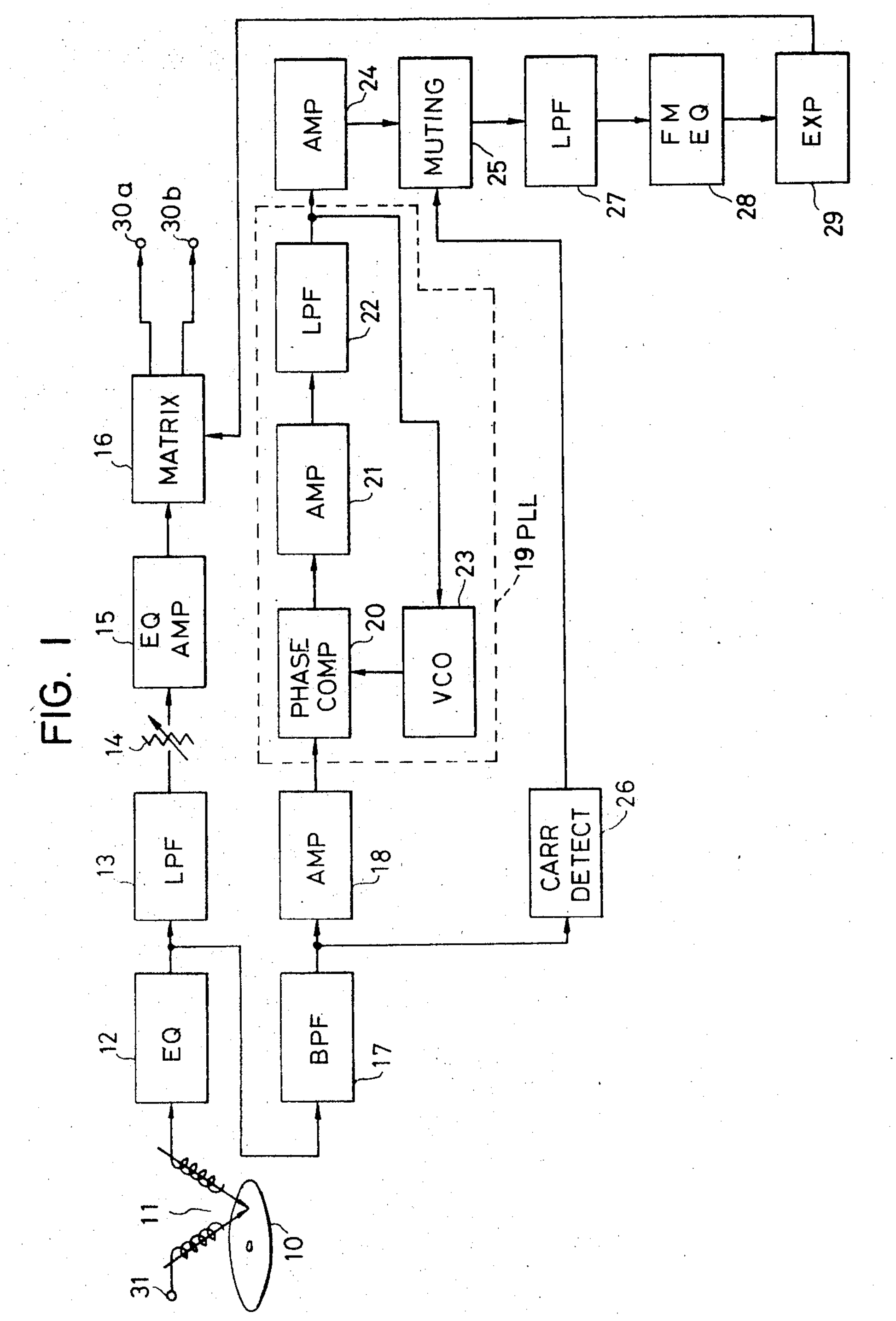
FIG. 1 is a block diagram showing the essential organization of one embodiment of a 4-channel record disc reproducing system using a demodulation circuit according to the present invention.

Referring first to FIG. 1 shows a first embodiment of the four channel record disc reproduction system using a demodulation circuit, according to the present invention.

In accordance with the recording system which the applicant proposed as described above, a four channel record disc 10 has a superposed signal of a direct wave sum signal and an angle modulated wave difference signal of two channel signals recorded on either wall of a sound groove, thereby providing four channel signals recorded in the groove. The signals picked up by a pick-up cartridge 11 from the groove of the disc 10 include a superposed signal of a direct wave sum signal and an angle modulated wave difference signal. Two channels are reproduced from the right wall of the groove and supplied to an equilizer 12, in which the direct wave sum signal is equalized according to the Record Industry Association of America characteristic.

This reproduced signal is supplied, on one hand, to a low-pass filter 13 in which the angle modulated wave component is removed and only the direct wave sum signal component is taken out. This direct wave sum signal component is supplied, through a variable resistor 14 for adjusting separation, to an equalizing amplifier 15 in which it is equalized and amplified. The sum signal component thereafter is supplied to a matrix circuit 16.

The output of the equalizer 12 is supplied, on the other hand, to a band-pass filter 17 having a filtering band of 20 KHz to 40 KHz in which the angle modulated wave difference signal component is derived. This angle modulated wave component is amplified in an amplifier 18 and thereafter is supplied to a phase comparator 20 of a phase locked loop (hereinafter referred to as PLL) here shown by a surrounding broken line. The output angle modulated wave from the band-pass filter 17 is also supplied to a carrier detection circuit 26 which is provided for detecting whether or not the angle-modulated wave exists. The output of the carrier detection circuit 26 is supplied to a muting circuit 25.

The PLL 19 is of a conventional construction including the phase comparator 20, an amplifier 21, a low-pass filter 22 and a voltage controlled oscillator 23. The phase comparator 20 compares the phase of the input angle-modulated wave supplied from the amplifier 18 with the phase of the output wave from the voltage controlled oscillator 23 comparator 20 produces an error voltage which varies as a function of the phase difference. The output error voltage is amplified in an amplifier 21 and thereafter is supplied through a low-pass filter 22 to an amplifier 24 and also fed back to the voltage controlled oscillator 23 as a control voltage.

When no input signal is supplied from the amplifier 18 to the phase comparator 20 or when the PLL 19 is not in locked condition, the voltage controlled oscillator 23 acts as a free-running oscillation at a frequency which is equal to the carrier frequency (30 KHz in the present embodiment) at which the angle modulation is made in the recording system. The voltage controlled oscillator 23 is controlled in its oscillation frequency by the control voltage from the low-pass filter so that its output frequency becomes equal to the frequency of the input angle-modulated wave to the phase comparator 20. Accordingly, the voltage obtained from the low-pass filter 22 (i.e., the input voltage to the voltage controlled oscillator 23) is a voltage corresponding to the frequency deviation of the angle-modulated wave supplied to the phase comparator 20. Therefore, a demodulated output of the angle-modulated wave is obtained from the PLL 19.

The above described operation on the PLL 19 is a demodulating operation common to a conventional PLL. The feature of the system according to the invention resides in the manner in which the lock range frequency characteristic is used, as will described later in detail.

The PLL 19 can operate as a PLL if the low-pass filter 22 is omitted in which case the PLL speed of response increases. Further, in actually constructing the circuit, care must be taken so as to prevent a superposition of the DC wave signal component upon the low frequency signal component in the input angle modulated wave signal otherwise the phase comparison capacity of the phase comparator 20 decreases if a DC component is included in the input signal to the phase comparator 20.

The demodulated difference signal obtained from the PLL 19 is amplified in the amplifier 24 and thereafter applied to the muting circuit 25. The muting circuit 25 is controlled by the output of the carrier detection circuit 26 to switch ON when the angle modulated wave signal component is included in the signal reproduced from the disc 10 and switched OFF when it is not included. Thus, the muting circuit 25 prevent a noise component from appearing in the output. It is to be noted that the carrier detection circuit 26 has a time constant which is large enough to cause the muting circuit 25 to an occurrence of noise when, for example, the playing back apparatus is not playing the disc. Accordingly, the muting circuit 25 is not operated during playing back of the disc 10 by the absence of signal and the drop in the level due to the damage of the groove, etc.

The output of the muting circuit 25 passes through a low-pass filter 27 in which the carrier component is removed. The signal then passes through an FM equalizer 28 and is expanded in an expandor 29 which is provided in correspondence to a compressor in the recording system, and thereby is adjusted in its frequency characteristic. Then the signal is applied to the matrix circuit 16. The matrix circuit 16 matrixes the applied sum signal and the difference signal, and sends out a first channel signal and a second channel signal, separately to output terminals 30*a* and 30*b*.

In FIG. 1, only the circuit system for the first and second channels (the left channel system of the groove of the disc 10) is illustrated. It will be understood that a similar circuit system is also provided for the third and fourth channels, and a signal obtained from a terminal 31 of the pick-up 11 is supplied to this similar (but now shown) circuit system. The construction and the operation of this circuit system for the third and fourth channels are entirely the same as the circuit system for the above described first and second channels so that illustration and description thereof are therefore omitted.

Figure 2:
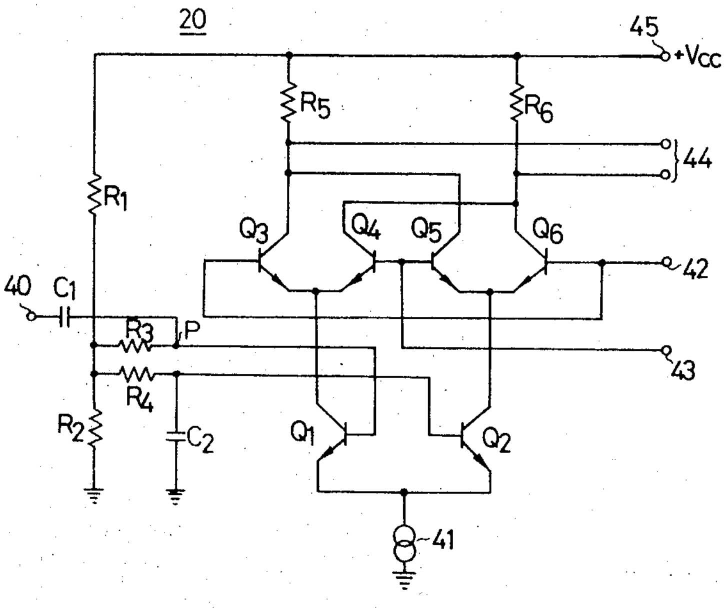
FIG. 2 PRIOR ART
FIG. 2 is a circuit diagram illustrating one embodiment of a phase comparator of a known differential amplification type.

The circuit of an embodiment of a conventional phase comparator, of a differential amplification type, for use as the phase comparator 20 of the above mentioned PLL 19 is illustrated in FIG. 2.

An angle-modulated wave signal from the amplifier 18 is applied to an input terminal 40 of this circuit and supplied through a capacitor C1 to the base of a transistor Q1. The emitters of this transistor Q1 and another transistor Q2 are connected commonly to a current source 41. The base of the transistor Q1 is connected by way of a resistor R3 to the junction between base-bias resistors R1 and R2, while the base of the transistor Q2 is similarly connected by way of a resistor R4 to the junction between the resistors R1 and R2. These resistors R1 and R2 are connected between a terminal 45 of a power-supply voltage of +Vcc and the ground (earth).

The transistors Q1 and Q2 and other transistors Q3, Q4, Q5, and Q6 constitute the essential components of a phase comparator of the differential amplification type. An oscillation signal from the voltage controlled oscillator 23 is applied by way of a terminal 42 to the bases of the transistors Q3 and Q6. A reference voltage is applied by way of a terminal 43 to the mutually connected bases of the transistors Q4 and Q5. The collector outputs of the transistors Q3 and Q5 and the collector outputs of the transistors Q4 and Q6 are respectively sent out through terminals 44 to the amplifier 21. Furthermore, the collectors of the transistors Q3 and Q5 and the collectors of the transistors Q4 and Q6 are respectively connected through resistors R5 and R6 to the power-supply voltage terminal 45. The emitters of the transistors Q3 and Q4 and the emitters of the transistors Q5 and Q6 are commonly connected respectively to the collectors of the transistors Q1 and Q2.

In order to derive an output from the amplifier 18 of the preceding stage of sufficient magnitude whereby the PLL circuit 19 can operate fully and, moreover, to prevent the operation of the phase comparator 20 from adverse affecting the amplifier 18, it is necessary to use a large input impedance in the input circuit of the phase comparator.

For this purpose, in the above described known circuit, a large resistance value was selected for the resistor R3 in order to obtain a large AC impedance at the junction point P between the capacitor C1 and the base of the transistor Q1. One example of the resistance values of the above mentioned resistors R1 through R4 is as follows.

$$R1 = 10\ K\Omega,\ R2 = 4.7\ K\Omega,\ R3 = R4 = 4.7\ K\Omega$$

When a large resistance value of the resistor R3 is thus selected, the DC impedance of the base bias with respect to the transistor Q1 determined by the resistors R1, R2, and R3 also becomes large.

Figures 3A, 3B:
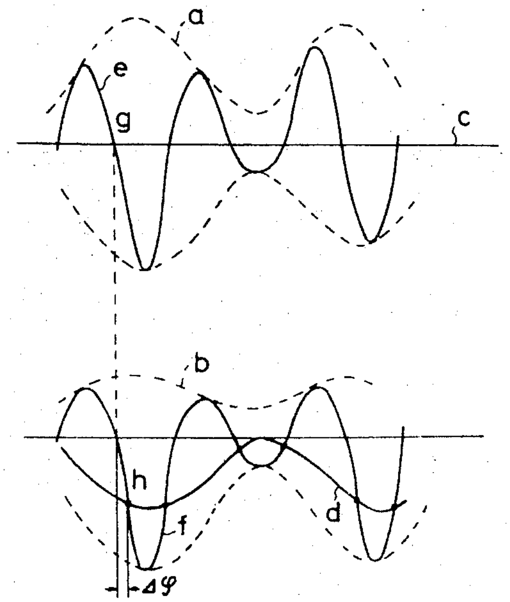
FIGS. 3A and 3B are waveform graphs respectively indicating the waveforms of signals at the input terminal and point P of the circuit shown in FIG. 2.

On one hand, in cases where the record grooves contain dust, or the groove walls have defects or are damaged, or where there is an absence of signal, or the level drops, and other noise is picked up with the angle-modulated wave, the envelope of the angle-modulated wave signal amplitude fluctuates widely, as indicated by the broken line *a* in FIG. 3A. Then, when the angle-modulated wave signal having an envelope variation as indicated in this FIG. 3A enters the circuit through the input terminal 40, the upper half cycle of this signal is rectified by the diode characteristic between the base and emitter of the transistor Q1 since the input DC impedance is high, as mentioned above. Consequently, the envelope of the angle-modulated wave signal at the point P becomes asymmetrical on its upper and lower sides as indicated by the broken line *b* in FIG. 3B.

Accordingly, the mean potential of the angle-modulated wave signal which is a straight line at the input terminal 40 (as indicated by the line *c* in FIG. 3A) becomes distorted and, at the point P, varies as indicated by the curve *d* in FIG. 3B. For this reason, a phase difference of $\Delta\phi$ is produced between the point *g* where the angle-modulated wave signal *e* in FIG. 3A crosses the line *c* and the point *h* where the angle-modulated wave signal *f* of FIG. 3B crosses the line *d*. In this case, an abnormal noise component other than a difference signal is generated in the demodulation signal of the angle-modulated wave indicated in FIG. 3B, and the tone quality of the reproduced sound is greatly impaired.

Accordingly, if a relatively small value of the DC impedance of the bias resistance of the above mentioned transistor can be selected, the above described difficulty will not occur, although a relatively large input AC impedance of the phase comparator is used. A feature of the present invention is the provision of a demodulation circuit in which this requirement is fulfilled. This feature will next be described with respect to a number of practical embodiments.

Figure 4:
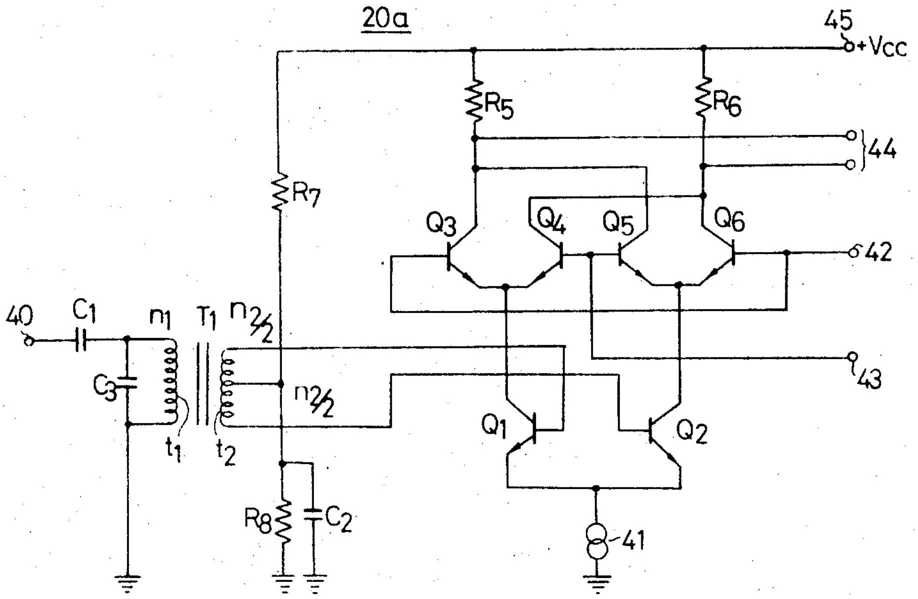
FIG. 4 is a circuit diagram showing a first embodiment of a phase comparator in a demodulation circuit according to the present invention.

The circuit of a first embodiment of a phase comparator in the demodulation circuit of the invention is shown in FIG. 4. The circuit element parts essentially the same as those in FIG. 2 are designated by like reference numerals and characters, and the detailed description thereof will not be repeated.

An angle-modulated wave signal is applied from the amplifier 18 to the input terminal 40 by way of the capacitor C1 connected to one end of the primary windings $t_1$ of an impedance-conversion transformer T1 of tuned type. The other end of the primary windings $t_1$ is grounded (earthed). Furthermore, a capacitor C3 is connected between the two ends of the primary windings $t_1$ and thereby forms a resonance circuit. The inductance value of the primary windings $t_1$ and the capacitance value of the capacitor C3 are so selected that the resonance circuit thereof resonates at 30 KHz which is the carrier wave frequency of the angle-modulated wave.

The two ends of the secondary windings $t_2$ of the impedance-conversion transformer T1 are respectively connected to the bases of the transistors Q1 and Q2. Base bias resistors R7 an R8 are connected between the power-supply voltage terminal 45. The ground (earth), and the capacitor C2 is connected in parallel with the resistor R8. The middle point of the secondary windings $t_2$ of the above mentioned transformer T1 is connected to the junction between the resistors R7 and R8. Other features of the circuit organization are the same as those of the conventional circuit.

In the circuit of the above described organization, the input AC impedance of the phase comparator circuit 20*a* of differential-amplifier type as viewed from the input terminal 40 is determined by the ratio of the number of turns $n_1$ and $n_2$ of the primary and secondary windings $t_1$ and $t_2$ and the input AC impedance of the primary side resonance circuit comprising the primary windings $t_1$ and the capacitor C3. Accordingly, this input AC impedance can readily be set at a relatively large value. Furthermore, the base-bias resistance with respect to the transistors Q1 and Q2 is the sum of the parallel resistance component of the resistors R7 and R8, that is, R7·R8/(R7 + R8) and the DC resistance component of the secondary winding $t_2$. Since the DC resistance component of the secondary winding $t_2$ is a very small value (ordinarily of the order of 10 Ω), it is almost negligible. Moreover, the resistance values of the resistors R7, and R8 can be selected at will and at small values. In the circuit of the present invention, therefore, the DC impedance can be set at a relatively small valve, and a large current can be passed irrespective and independently of the AC impedance.

In the instant embodiment, the selected ratio of the number of turns $n_1/n_2$ is 2/1, and the selected resistance values of the resistors R7 and R8 are 1 KΩ and 470 Ω, respectively.

Since the above mentioned AC impedance can thus be set at a relatively large value in the order of 40 KΩ, for example, a relatively large output can be derived from the amplifier 18. Furthermore, since the above mentioned DC impedance is of a relatively small value of the order of 330 Ω, for example, no substantial rectifying effect is produced due to the diode characteristic of the input transistor Q1 when an angle-modulated wave signal of a waveform having an amplitude variation as indicated in FIG. 3A arrives from the amplifier 18. Therefore, when the angle-modulated wave signal indicated in FIG. 3A arrives, no phase variation is produced, and it is possible to obtain an excellent demodulation output without abnormal noise.

Another advantageous feature of the circuit of the instant embodiment occurs because the middle point of the secondary windings $t_2$ of the transformer T1 is connected to the junction between the resistors R7 and R8. Therefore the circuit of this embodiment has an advantage that it is difficult for noise to enter through the ground (earth) line.

Next, other embodiments of the input circuits of the input transistors Q1 and Q2 of the phase comparator of differential amplifier type will now be described in conjunction with FIGS. 5 and 6. Throughout FIGS. 4, 5, and 6, circuit element parts of like organization are designated by like reference numerals and characters, and further description thereof will be omitted.

Figure 5:
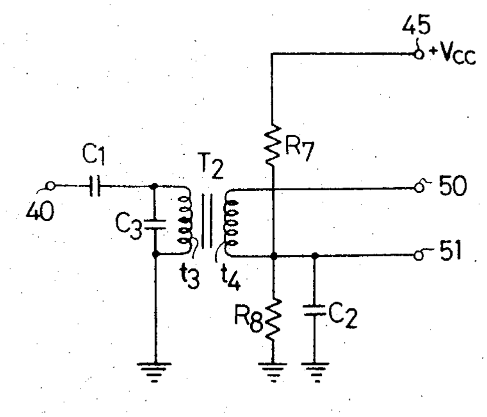
FIG. 5 is a circuit diagram showing the essential parts of a second embodiment of a phase comparator of the invention.

In the circuit of the embodiment illustrated in FIG. 5, the primary windings $t_3$ of an impedance-conversion transformer T2 is connected in parallel with the capacitor C3. One end of this primary windings $t_3$ is connected through the capacitor C1 to the input terminal 40, while the other end thereof is grounded. The secondary windings $t_4$ of the transformer T2 is connected at its one end through a terminal 50 to the base of the transistor Q1 and at its other end to the junction between the resistors R7 and R8 for base bias and through a terminal 51 to the base of the transistor Q2.

In the circuit of this embodiment, it is also possible to set the AC impedance at a very large value and the DC impedance at a relatively small value similarly as in the first embodiment illustrated in FIG. 4.

Figure 6:
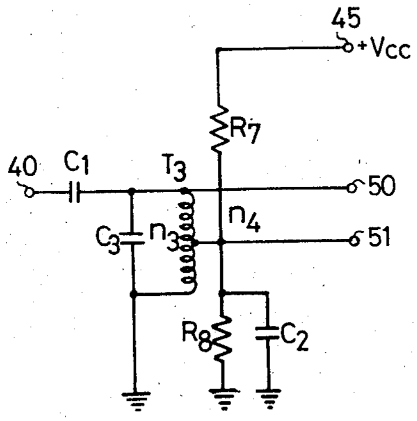
FIG. 6 is a circuit diagram showing the essential parts of a third embodiment of a phase comparator of the invention.

In the circuit of the embodiment shown in FIG. 6, there is provided a coil T3 of $n_3$ winding turns connected at one end thereof through the capacitor C1 to the input terminal 40 and through the terminal 50 to the base of the transistor Q1. The capacitor C3 is connected in parallel with this coil T3. A tap point of the coil T3 is connected through the terminal 51 to the base of the transistor Q2 and is further connected to the junction between the resistors R7 and R8, the other end of the coil T3 being grounded through the resistor R8.

In the instant embodiment, the number of winding turns $n_3$ of the coil T3 and the coil winding turns $n_4$ at the tap point are predetermined to have a ratio of 2:1. That is, the tap point is so provide that it is the middle point of the coil T3.

A feature of the circuit of this embodiment is that, with a simpler circuit organization, this circuit affords an operational effectiveness equivalent to those of the circuits of the preceding embodiments.

Figure 7:
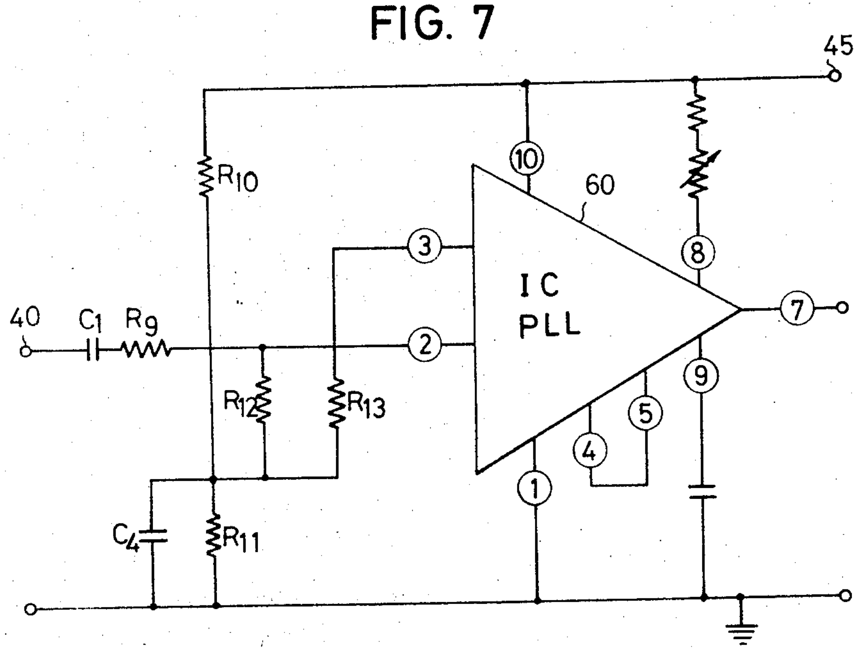
FIG. 7 is a circuit diagram showing a fourth embodiment of a demodulation circuit of the invention.

In still another embodiment of the demodulation circuit of the invention as illustrated in FIG. 7, there is afforded an operational effectiveness equivalent to those of the circuits of the preceding embodiments without the use of a relatively expensive impedance-conversion transformer as used in the circuits of the preceding embodiments.

In this embodiment, there is provided a PLL circuit 60 in the form of an integrated circuit having terminals ② and ③ corresponding to the input terminals at the bases of the transistors Q1 and Q2, respectively. An angle-modulated wave signal applied to the input terminal 40 is passed through the capacitor C1 and a resistor R9 (having a relatively large resistance value as described hereinafter) to the terminal ②. The junction between bias resistors R10 and R11 correspond to resistors R7 and R8 in the preceding embodiments and are connected by way of a resistor R12 to the terminal ② of the PLL circuit 60 and by way of a resistor R13 to the terminal ③. A capacitor C4 is connected in parallel with the resistor R11.

In the instant embodiment, the quantitative constants of the various constituent elements of the circuit are selected as follows.

| | | | |
|---|---|---|---|
| Resistors | R9 | 15 | KΩ |
| | R10 | 10 | KΩ |
| | R11 | 10 | KΩ |
| | R12 | 560 | Ω |
| | R13 | 560 | Ω |
| Capacitors | C1 | 0.0022 | μF |
| | C4 | 1 | μF |

As is apparent from the above embodiment of quantitative values, a relative large resistance value is selected for the resistor R9, whereby a large AC impedance is obtained. Furthermore, by the use of this resistor R9, the charging current due to the capacitor C1 is held at a small value. In addition, the resistance values of the resistors R12 and R13 are made equal and, moreover, are made small. There is no difference between the impedances at the time of charging and at the time of discharging capacitor C1, whereby the bias voltages with respect to the bases of the transistors Q1 and Q2 connected to the terminals ② and ③ are maintained equal. Furthermore, the DC impedance of the base bias resistances is also small.

By the circuit of the instant embodiment, there is also afforded an operational effectiveness equivalent to those of the preceding embodiment. Yet, since a relatively inexpensive impedance-conversion transformer is used, the circuit has a simple organization and can be produced at low cost.

Further, this invention is not limited to these embodiments but various variations and modifications may be made without departing from the scope and spirit of the invention.

What we claim is:

1. A circuit for demodulating a multichannel disc having recorded thereon a multiplex signal including a non-modulated audio signal and an angle-modulated carrier wave signal, said demodulation circuit comprising a voltage controlled oscillator means for generating a signal having a frequency which is varied in accordance with a control signal, a phase comparator circuit means including a differential amplifier for comparing the phase of the output signal of said voltage controlled oscillator with the phase of the angle-modulated wave signal and for producing an error signal corresponding to the detected phase difference, said error signal representing a demodulated audio signal, and means for applying a part of said error signal to said voltage controlled oscillator as said control signal therefor, whereby the frequency of the signal generated by said voltage controlled oscillator coincides with the frequency of the angle-modulated carrier, said phase comparator circuit means comprising a pair of transistor means connected in said differential amplifier configuration, a direct current biasing circuit including a series combination of two resistors connected across a power source means for applying a direct current bias voltage from the junction of the two resistors to the base electrodes of the pair of transistors, means for applying the angle-modulated wave signal from an amplifier through a preceding circuit to at least one of the base electrodes, said preceding circuit being constructed so that the AC impedance measured from the amplifier looking toward said phase comparator circuit is relatively large and the DC impedance looking back from the one base electrode is relatively small, whereby the angle-modulated wave signal is not phase-shifted when the amplitude of the envelope of the angle-modulated wave signal varies.

2. The demodulation circuit of claim 1 wherein said preceding circuit comprises an impedance conversion transformer having a primary winding across which the angle-modulated wave signal is applied and having a secondary winding, the opposite ends of which are respectively connected to the base electrodes of the pair of transistors, said secondary winding having a center tap connected to the junction of the two resistors.

3. The demodulation circuit of claim 2 and a capacitor connected in parallel with the primary winding of the transformer to form a resonant circuit at the center frequency of the carrier of the angle-modulated wave signal.

4. The demodulation circuit of claim 1 wherein said preceding circuit comprises an impedance conversion transformer having a primary winding across which the angle-modulated wave signal is applied and having a secondary winding, the opposite ends of which are respectively connected to the base electrodes of the pair of the transistors, and a capacitor connected in parallel with the primary winding of the transformer to form a resonant circuit at the center frequency of the carrier of the angle-modulated wave signal, the junction of the two resistors being connected to a center tap of said secondary winding.

5. The demodulation circuit of claim 1 wherein said preceding circuit comprises a coil across which the angle-modulated wave signal is applied, one end of said coil being connected to the base electrode of one of the pair of transistors, the other end of said coil being connected to a ground, said coil having a center tap connected to the base electrode of the other of the pair of transistors and to the junction of the two resistors, and a capacitor connected in parallel with said coil to form a resonant circuit at the center frequency of the carrier of the angle-modulated wave signal.

6. The demodulation circuit of claim 1 wherein said preceding circuit comprises a resistor of a relatively large resistance value, means for feeding the angle-modulated wave signal to one end of said large resistor, the other end of said large resistor being connected to the base electrode of one of the pair of transistors, means for connecting the base electrodes of the pair of transistors through a series circuit comprising two resistors, the respective resistance values of which are relatively small and mutually equal, the junction of the two resistors of said series circuit being connected to the junction of the two resistors of the series combination of the direct current biasing circuit.

7. A system for demodulating the signals recorded on a multichannel disc, said demodulation system comprising means having a phase-locked loop phase comparator means including a differential amplifier means, means for applying to an input of said differential amplifier an angle-modulated wave signal picked up from a multichannel record disc, means comprising a voltage controlled oscillator for supplying a control voltage to said phase comparator means responsive to a fed back portion of the output of said phase comparator means, said phase comparator means having an input circuit for connecting it to a preceding stage, said input circuit including a pair of input transistors and base bias resistors for setting the AC impedance of said pair of input transistors at a relatively large impedance value and for setting the DC impedance at a relatively small value, whereby demodulation can be accomplished without causing a phase difference with respect to said input angle-modulated wave signal when the amplitude envelope of said input signal varies.

8. The demodulation system of claim 7 in which said input circuit of the phase comparator comprises an impedance conversion transformer having a primary winding connected to the output side of the preceding stage and a secondary winding respectively connected at the two ends thereof to the bases of said pair of input transistors.

9. The demodulation system of claim 8 and a capacitor connected in parallel with said primary winding of the transformer to form a resonant circuit, and the ratio of the number of turns of the primary and secondary windings of the transformer and the impedance of the resonant circuit being selected so that said AC impedance becomes relatively large, while the base bias resistors and the resistance component of said secondary windings are selected so that said DC impedance becomes relatively small.

10. The demodulation system of claim 8 in which the middle point of said secondary windings of the transformer is connected through one of the base bias resistors to a power source.

11. The demodulation system of claim 7 in which said input circuit of the phase comparator comprises a coil for impedance conversion connected at one end thereof to the output side of said preceding stage and to the base of one of said pair of input transistors, the other end of said coil being connected to ground, and a midpoint of said coil being connected through one of the base bias resistors to a power source and to the base of the other of the pair of input transistors.

12. The demodulation system of claim 7 in which said input circuit of the phase comparator comprises a resistor having a relatively high resistance value connected to the base of one of said pair of input transistors, and a pair of equal resistors having a small resistance value connected between the base bias resistors and the bases of the pair of input transistors.

* * * * *